(No Model.)
T. A. EDISON.
ELECTRICAL DISTRIBUTION SYSTEM.
No. 263,142. Patented Aug. 22, 1882.
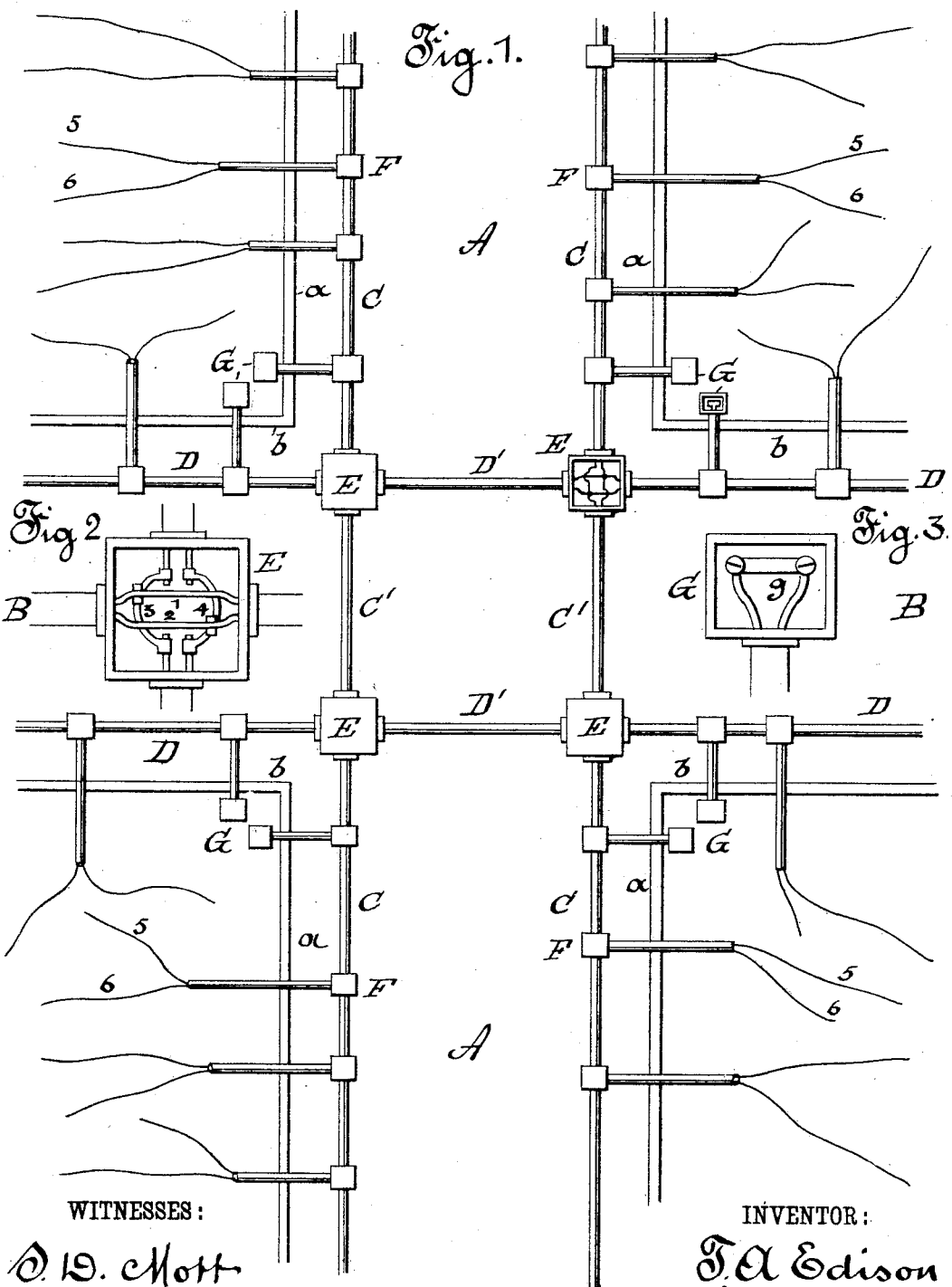

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

ELECTRICAL DISTRIBUTION SYSTEM.

SPECIFICATION forming part of Letters Patent No. 263,142, dated August 22, 1882.

Application filed October 4, 1881. (No model.)

*To all whom it may concern:*

Be it known that I, THOMAS A. EDISON, of Menlo Park, in the county of Middlesex and State of New Jersey, have invented a new and useful Improvement in Electrical Distribution Systems, (Case No. 343;) and I do hereby declare that the following is a full and exact description of the same, reference being had to the accompanying drawings, and to the letters of reference marked thereon.

The object of my invention is to produce such an improvement upon systems for the distribution of electricity for translation into sensible effect—such as light, power, or heat— that an accidental cross between the main wires at any point will only affect the house-circuits upon the side or face of the block where the cross occurs.

In laying the conductors for my system I run along each side or face of a block two conductors. These I term "positive" and "negative" conductors, the positive conductor being the one through which the positive current flows to the lamps or motors, while the negative conductor returns the current to the feeding-circuit, and thence through the negative feeding-conductor back to the generators. In front of each house, or at any other point where it is desired to make connection with the main conductors, they are run into a service-box, which is a square iron box, in which the conductors are laid bare for connection with the house-wires. At each corner of a block is a junction-box, into which the conductors on the meeting sides of the block pass, and also conductors which cross the streets from the opposite junction-boxes. Thus at the intersection of two streets will be placed four junction-boxes, into each of which will run eight main conductors. In each of such junction-boxes all the positive conductors are connected together, and likewise all the negative conductors, so that a net-work of intersecting wires is formed. On each face of a block, anywhere between the points of intersection of the main conductors in the corner junction-boxes, the conductors are run through a small junction-box; or one of them only may pass through the same. In this box one conductor is severed and its ends connected to conductors leading to a safety-catch box located at some point where it can be conveniently reached to replace the safety-catch wire when necessary; or both conductors may run through this box and be provided with safety-catches. In this box the requisite amount of safety-catch wire or material is placed in circuit, and is burned out when a cross on the main conductors occurs on the particular side of the block where the box is located, thus breaking the circuit and preventing damage. By placing safety-catches in this manner in the main conductors on each face or side of a block the accidental cross-connection can be readily located, and by connecting all the main conductors of each class together at the corners only the translating devices on the particular side of the particular block are affected by the breaking of the circuit.

The foregoing will be better understood from the drawings, in which Figure 1 is a top view of the conductors at the intersection of two streets, the covers of a corner junction-box and a safety-catch box being removed; Fig. 2, a separate view of a corner junction-box with the cover removed, and Fig. 3 a similar view of a safety-catch box.

Like letters denote corresponding parts in all three figures.

A and B are two intersecting streets, and *a b* the curb.

C D are the tubes or pipes inclosing the conductors. These tubes or pipes run along the faces of the blocks, and enter the corner junction-boxes E, while similar tubes, C' D', placed in line with C D cross the streets and connect the junction-boxes. Each of these tubes carries two main conductors in the manner described and shown in an application for patent already filed by me, (Serial No. 31,825;) or the conductors may be inclosed in separate pipes, as set forth in an application of even date herewith.

The house-service boxes are shown at F, and from these are led the house wires or conductors 5 6.

E E show the corner junction-boxes, in which the four conductors intersect, like conductors being electrically connected. The use of such boxes enables the points of union to be readily reached, so that disconnection may be easily made when desired. The preferable form of connection across the box of the conductors forming a continuous line is by bow-shaped conductors, as shown in Fig. 2, as thereby provision is made for contraction or expansion due to varying temperature, such effects being ultimately conveyed to the bow-shaped conductors, which absorb them without risk of breaking the continuity of the electric circuit.

G represents the safety-catch boxes, one being situated on the face of each block, as before explained, and having a piece of safety-catch wire, $g$, placed in the line of one or each of the main conductors. These safety-catch boxes are preferably located inside of the curb, and are arranged so that they can be readily reached to replace the safety-catch wire. This arrangement of the safety-catches protects the entire system from the effects of malicious or accidental crossing or short-circuiting, except of course at the immediate vicinity of the crossing or short-circuiting. If on the face of either block the main conductors should be so connected as to short-circuit the lamps, the safety-catches on either side would be immediately burned out, a short section, not over the face of a block, be cut out, while the remainder of the system would be uninjured and unaffected.

What I claim is—

1. In a system of electrical distribution employing complete metallic circuits, the combination of the positive conductors and the negative conductors crossing each other at the corners of the blocks, like conductors being connected together at the points of crossing, and service or junction boxes wherein such connection is made, substantially as set forth.

2. In a system of electrical distribution, the combination, with the intersecting positive and the intersecting negative conductors connected together in pairs, as described, of the safety-catches between the points of intersection, substantially as set forth.

3. In a system of electrical distribution, the combination, with the main conductors arranged in pairs, intersecting each other and properly connected together at corners or branching points, of safety-catches placed at the points of intersection in boxes adapted to protect them and receive the ends of the conductors for union thereto, substantially as set forth.

4. The combination, with the conductors and the junction-boxes wherein the appropriate conductors are united to each other, of the bow-shaped connecting-pieces, substantially as set forth.

This specification signed and witnessed this 24th day of August, 1881.

THOMAS A. EDISON.

Witnesses:
RICHD. N. DYER,
H. W. SEELY.